(12) United States Patent
Innocenti et al.

(10) Patent No.: US 12,373,424 B2
(45) Date of Patent: Jul. 29, 2025

(54) SUPPORTING TWO PHASE COMMIT PROTOCOL IN BLOCKCHAIN SYSTEM

(71) Applicant: Oracle International Corporation, Redwood Shores, CA (US)

(72) Inventors: Carlo Innocenti, Wakefield, MA (US); Sharthak Mishra, Karnataka (IN); Vignesh Subramanian, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/301,115

(22) Filed: Apr. 14, 2023

(65) Prior Publication Data
US 2024/0346011 A1    Oct. 17, 2024

(51) Int. Cl.
G06F 16/23    (2019.01)
G06F 16/25    (2019.01)

(52) U.S. Cl.
CPC ........ G06F 16/2379 (2019.01); G06F 16/252 (2019.01)

(58) Field of Classification Search
CPC ............................ G06F 16/2379; G06F 16/252
See application file for complete search history.

(56) References Cited

U.S. PATENT DOCUMENTS

| | | | |
|---|---|---|---|
| 5,546,582 A * | 8/1996 | Brockmeyer | G06F 16/2379 709/248 |
| 6,728,719 B1 | 4/2004 | Ganesh et al. | |
| 9,589,041 B2 | 3/2017 | Tran et al. | |
| 9,747,356 B2 | 8/2017 | Lu et al. | |
| 9,767,178 B2 | 9/2017 | Srivastava et al. | |
| 9,830,372 B2 | 11/2017 | Rajamani et al. | |
| 9,904,722 B1 | 2/2018 | Shevade et al. | |
| 10,191,932 B2 | 1/2019 | Lehouillier et al. | |
| 10,616,324 B1 | 4/2020 | Kaddoura | |

(Continued)

FOREIGN PATENT DOCUMENTS

| | | | | |
|---|---|---|---|---|
| CN | 111008206 A | * | 4/2020 | ......... G06F 16/2365 |
| CN | 111241589 A | * | 6/2020 | |

(Continued)

OTHER PUBLICATIONS

Stamos, U.S. Appl. No. 16/932,633, filed Jul. 17, 2020, Notice of Allowance and Fees Due, Jan. 19, 2023.

(Continued)

*Primary Examiner* — Neveen Abel Jalil
*Assistant Examiner* — Hubert Cheung
(74) *Attorney, Agent, or Firm* — Hickman Becker Bingham Ledesma LLP (57) ABSTRACT

A blockchain system is enabled to participate in distributed transactions that uses a two-phase commit protocol ("2PC"). In a 2PC, a computer system, such as a DBMS or blockchain system, commits a transaction that changes data (e.g. database, world state) using two phases. To participate in a distributed transaction using 2PC, a blockchain system executes a "staged transaction". A staged transaction transitions through the 2PC phases. In the prepare phase, the new values for world state records are staged in staging records as staged values. In the second phase, if the distributed transaction is to be committed, the world staging records are set to the staged values.

18 Claims, 7 Drawing Sheets

(56) References Cited

U.S. PATENT DOCUMENTS

| | | | |
|---|---|---|---|
| 11,025,409 | B1 | 6/2021 | Fields |
| 11,108,553 | B2 | 8/2021 | Irazabal |
| 11,145,017 | B1 | 10/2021 | Wu |
| 11,343,313 | B1 * | 5/2022 | Manevich ............ H04L 67/1085 |
| 2007/0299887 | A1 | 12/2007 | Novik et al. |
| 2008/0162728 | A1 | 7/2008 | Robeal |
| 2010/0153423 | A1 | 6/2010 | Lu et al. |
| 2016/0224604 | A1 | 8/2016 | Petculescu et al. |
| 2017/0123846 | A1 | 5/2017 | Gschwind et al. |
| 2017/0352012 | A1 | 12/2017 | Hearn et al. |
| 2018/0152289 | A1 | 5/2018 | Hunt et al. |
| 2018/0158034 | A1 | 6/2018 | Hunt |
| 2018/0349458 | A1 * | 12/2018 | Guirguis ............... G06F 16/273 |
| 2018/0374086 | A1 | 12/2018 | Ardashev |
| 2019/0156332 | A1 | 5/2019 | Christidis et al. |
| 2019/0238525 | A1 | 8/2019 | Padmanabhan et al. |
| 2019/0342149 | A1 | 11/2019 | Guo et al. |
| 2019/0356674 | A1 | 11/2019 | Irazabal et al. |
| 2019/0370793 | A1 | 12/2019 | Zhu et al. |
| 2019/0372772 | A1 | 12/2019 | Novotny |
| 2019/0378134 | A1 | 12/2019 | Asari |
| 2020/0082025 | A1 * | 3/2020 | Zhou ........................ G06F 16/11 |
| 2020/0125556 | A1 * | 4/2020 | Yang ......................... H04L 9/50 |
| 2020/0167243 | A1 * | 5/2020 | Rauh ................... H04L 67/1097 |
| 2020/0250694 | A1 * | 8/2020 | Mock ..................... G06Q 20/40 |
| 2020/0310860 | A1 * | 10/2020 | Arumugam ............. G06F 9/542 |
| 2020/0327545 | A1 | 10/2020 | Xie |
| 2020/0364201 | A1 | 11/2020 | Cseri et al. |
| 2020/0374106 | A1 | 11/2020 | Padmanabhan |
| 2020/0387432 | A1 | 12/2020 | Kamijoh |
| 2021/0014042 | A1 | 1/2021 | Sivathanu et al. |
| 2021/0034606 | A1 * | 2/2021 | Stamos ................. G06F 16/184 |
| 2021/0149775 | A1 | 5/2021 | Novotny |
| 2022/0027348 | A1 * | 1/2022 | Manevich ............ G06F 16/2379 |
| 2022/0035652 | A1 * | 2/2022 | Stamos ................. H04L 9/0637 |
| 2022/0284011 | A1 * | 9/2022 | Qian .................... G06F 16/2343 |
| 2022/0358098 | A1 * | 11/2022 | Stamos ............... G06F 16/2379 |
| 2023/0062434 | A1 * | 3/2023 | Wagner ................ G06Q 20/405 |
| 2024/0070166 | A1 * | 2/2024 | Innocenti ................ G06F 16/27 |

FOREIGN PATENT DOCUMENTS

| | | | | |
|---|---|---|---|---|
| CN | 114936256 | A * | 8/2022 | |
| CN | 114942847 | A * | 8/2022 | |
| CN | 116433373 | A * | 7/2023 | |
| WO | WO2017/161275 | | 9/2017 | |
| WO | WO-2021021757 | A1 * | 2/2021 | ............ G06F 16/184 |
| WO | WO-2021030906 | A1 * | 2/2021 | ............ H04L 69/162 |
| WO | WO-2023185045 | A1 * | 10/2023 | ............ H04L 9/0869 |
| WO | WO-2023185051 | A1 * | 10/2023 | ............ H04L 9/0869 |
| WO | WO-2023231343 | A1 * | 12/2023 | ......... H04L 67/1059 |
| WO | WO-2023231344 | A1 * | 12/2023 | ......... H04L 67/1051 |

OTHER PUBLICATIONS

Stamos, U.S. Appl. No. 16/932,633, filed Jul. 17, 2020, Notice of Allowance and Fees Due, Oct. 6, 2022.

Stamos, U.S. Appl. No. 16/932,633, filed Jul. 17, 2020, Non-Final Rejection, Mar. 29, 2022.

Stamos, U.S. Appl. No. 16/944,011, filed Jul. 30, 2020, Final Rejection, May 4, 2023.

Stamos, U.S. Appl. No. 16/944,011, filed Jul. 30, 2020, Non-Final Rejection, Dec. 5, 2022.

Wikipedia.com, "Two-Phase Commit Protocol", Wikipedia, The Free Encyclopedia, https://en.wikipedia.org/w/index.php?title=two-phase_commit_protocol&oldid=886121497, dated Mar. 2019, 9 pages.

Wikipedia.com, "Raft (Algorithm)", Wikipedia, The Free Encyclopedia, https://en.wikipedia.org/w/index.php?title=raft_(computer_science)&oldid=89512171 8, dated May 2019, 7 pages.

Muzammal et al., "Renovating Blockchain with Distributed Databases: An Open Source System", Future Generation Computer Systems, Jul. 23, 2018, 27 pages.

Ezhilchelvan et al., "Non-Blocking Two Phase Commit Using Blockchain", 1st Workshop on Cryptocurrencies and Blockchains Distributed Systems, CryBlock'18, dated Jan. 1, 2018, pp. 36-41.

Cucurull et al., "Distributed Immutalilization of Secure Logs", dated Sep. 17, 2016, Big Data Analytics in the Social and Ubiquitous Context, 16 pages.

Anonymous: "Two-Phase Commit Protocol - Wikipedia", dated Mar. 4, 2019, https://en.wikipedia.org/w/index.php?title=Two-phase_commit_protocol&oldid=886121497, retrieved on Sep. 28, 2020, 6 pages.

Anonymous: "Raft (computer science)—Wikipedia", dated May 2, 2019, https://en.wikipedia.org/w/index.php?title=Raft_computer_science)&oldid=895121718, dated Sep. 28, 2020, 4 pages.

Zsolt et al., "StreamChain: Do Blockchains Need Blocks?", Proceedings of the 2nd Workshop on Scalable and Resilient Infrastructures for Distributed Ledgers, Dec. 10, 2018, pp. 1-6, XP093181815.

Anonymous, "Ledger", Jul. 6, 2022, XP093181665, 10 pages, retrieved: https://hyperledger-fabric.readthedocs.io/en/release-2.2/ledger/ledger.html documentation.

Androulaki et al., "Endorsement in Hyperledger Fabric", 2019 IEEE International Conference on Blockchain (Blockchain), IEEE, Jul. 14, 2019, pp. 510-519.

Alkhatib et al., "Transaction Management in Distributed Database Systems: the Case of Oracle's Two-Phase Commit", Journal of information systems education, Mar. 1, 2023, p. 95, XP093181830.

Anynymous, "Blockchain-based database—Wikipedia", May 28, 2020, 3 pages, Available: https://en.wikipedia.org/w/index.php?title=Blockchainbased_database&oldid=959295487.

Stamos, U.S. Appl. No. 18/405,122, filed Jan. 5, 2024, Notice of Allowance and Fees Due, Jan. 31, 2025.

Stamos, U.S. Appl. No. 18/405,122, filed Jan. 5, 2024, Notice of Allowance and Fees Due, Jan. 17, 2025.

* cited by examiner

SUPPORTING TWO PHASE COMMIT PROTOCOL IN BLOCKCHAIN SYSTEM

FIELD OF THE INVENTION

The present disclosure relates to distributed transactions involving blockchain systems.

BACKGROUND

In a blockchain system, blockchain clients submit transaction requests to the blockchain system to change a database referred to as the world state. The changes are recorded in the blockchain as blockchain transactions ("BC transactions"). A blockchain system is decentralized and distributed, meaning the blockchain system has multiple copies of both the blockchain and the world state. Copies of the blockchain may be collectively referred to herein as a blockchain.

The world state comprises world state records that each contain one or more values. A world state record may be, for example, a key-value pair that represents currency tokens spent and generated for a transaction.

A blockchain system comprises multiple peers, some or all of which are responsible for participating in forming and approving BC transactions and/or recording the BC transactions in their respective blockchain copy.

In a blockchain system, multiple peers may receive transaction requests. A blockchain transaction for each transaction request must be approved by multiple peers in the blockchain system. Multiple BC transactions may be grouped into a "transaction block" that is to be appended to every copy of the blockchain in the blockchain system. The appending of a block containing one or more blockchains transactions and any changes specified by the BC transactions to the world state are committed together.

A blockchain system may support multiple blockchains and respective world states. Each blockchain and its respective world state may be managed by a different set of the peers in the blockchain system. Within a blockchain system that supports multiple blockchains and respective world states, a blockchain, the respective world state, the respective peers and/or computing nodes that participate in managing the blockchain and world state, are referred to as a blockchain channel.

Cross-Blockchain Transactions: Heterogeneous-Distributed Transactions.

An increasingly common scenario for blockchain systems involves cross-BC transactions. A cross-BC transaction changes multiple world states of respective multiple blockchains. Each change to each world state is recorded in respective separate blockchains. For example, a cross-BC transaction may involve the selling of property owned by party A in exchange for tokens paid by party B. The payment of tokens and transfer of property are processed in two different blockchain systems, a bank blockchain system and a property-recording blockchain system. The payment of tokens is recorded in a BC transaction in the bank blockchain system and the exchange of property is recorded in a BC transaction in the property-recording blockchain system.

It is desirable to perform a cross-BC transaction atomically across multiple respective blockchains. For example, to execute the cross-blockchain for the property sale, it is desirable to treat both BC transactions as both being successfully committed together, that is, atomically, or not committed at all.

An approach that is used to perform a cross-BC transaction atomically is eventual atomicity. In eventual atomicity, a cross-BC transaction executed for a client is executed as separate BC transactions. The client issues the separate BC transactions to respective blockchain systems. If one BC transaction succeeds but another fails, the client issues a compensating BC transaction for the successful BC transaction to, in effect, undo the changes to the BC transaction that succeeded.

Another scenario that may become widespread in blockchain systems involves heterogeneous-distributed transactions. A heterogenous-distributed transaction is an atomically executed distributed transaction comprising one or more transactions executed on a blockchain system and one or more transactions executed on a non-blockchain data processing system, such as a database management system (DBMS). A heterogenous-distributed transaction may also be executed atomically using eventual atomicity.

There are at least several drawbacks to eventual atomicity. The approach requires that a client implement code to handle compensation transaction processing, which can be very complicated. In addition, until the compensation transaction is executed, the state of the respective world states may be left inconsistent for an inordinate period of time.

DETAILED DESCRIPTION

In the following description, for the purposes of explanation, numerous specific details are set forth in order to provide a thorough understanding of the present invention. It will be apparent, however, that the present invention may be practiced without these specific details.

General Overview

Described herein are approaches that enable a blockchain system to participate in distributed transactions that uses a two-phase commit protocol ("2PC"). In a 2PC, a computer system, such as a DBMS or blockchain system, commits a transaction that changes data (e.g. database, world state) using two phases. The first phase is the prepare phase. In the prepare phase, a computer system reaches a "prepared state". When in the prepared state, the computer system has reached a state in which the computer system can commit a transaction or rollback the transaction, if the computer system is requested or otherwise decides to. In the second phase, a computer system either commits or rollbacks the transaction. The second phase may be referred to herein as either the commit phase or the rollback phase, depending on whether the transaction is committed or rolled back in the second phase. A computer system enabled for 2PC can participate in distributed transactions that are committed or rolled back as a single transaction using 2PC.

To participate in a distributed transaction using 2PC, a blockchain system executes a "staged transaction". A staged transaction transitions through the 2PC phases. In the prepare phase, the new values for world state records are staged in staging records as staged values. In the second phase, if the distributed transaction is to be committed, the world state records are set to the staged values.

A staged transaction comprises two separate BC transactions that each commit a change the world state. In the prepare phase, the world state is changed to store the staged values in staging records; a "prepare BC transaction" is committed to change the world state to store the staged values in stage records. In the second phase, a "commit BC transaction" may be committed to set the world state records to the staged values.

Exemplary Blockchain System

Figure 1:
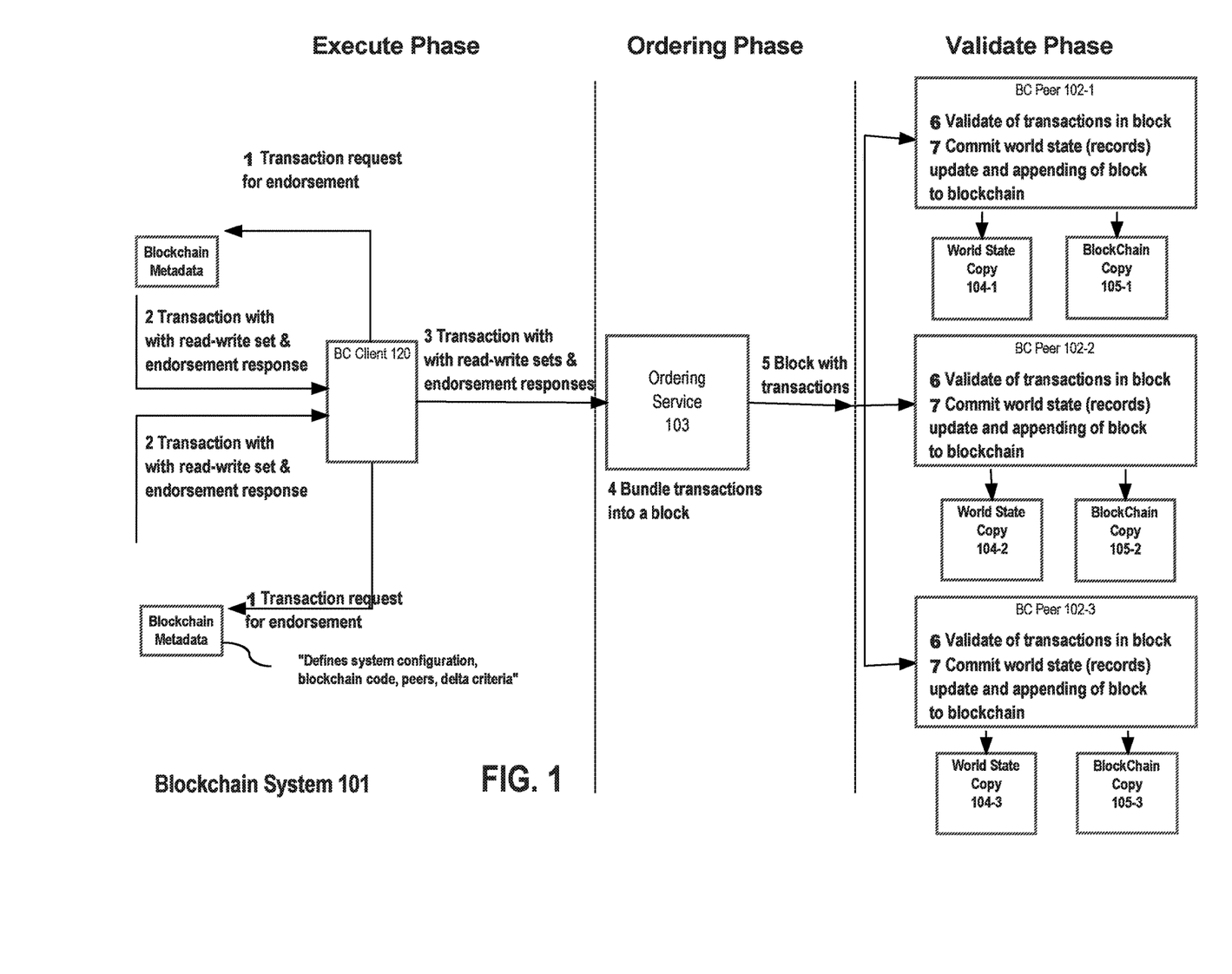
FIG. 1 is a diagram depicting a blockchain system according to an embodiment of the present invention.

FIG. 1 depicts Blockchain System 101, an illustrative blockchain system used in an embodiment of the present invention. Blockchain system 101 manages a blockchain and the respective world state using an approach referred to herein as the Execute-Order-Validate approach, the phases and steps of which are depicted in FIG. 1. As the name of the approach indicates, the phases include the Execute Phase, the Order Phase, and the Validate Phase. Each of these phases and the steps performed therein shall be explained in greater detail.

Blockchain System 101 includes peer computing nodes that participate in the Execute Phase and/or Validate Phase phases. A peer computing node may be referred to herein as a BC peer or simply a peer. Blockchain System 101 includes BC peers 102-1, 102-2 and 102-3, which may be referred to herein collectively as BC peers 102.

The Ordering Phase is performed by an ordering service that may or may not be a peer. Computing nodes that perform in the Ordering Phase are not depicted in FIG. 1.

As shall be explained in further detail, each of BC peers 102 maintains a blockchain copy of the distributed blockchain of Blockchain System 101 and a world state copy of the distributed world state of Blockchain System 101. BC peer 102-1, 102-2, and 102-3 maintain both World State Copies 104-1, 104-2 & 104-3 and Blockchain Copies 105-1, 105-2, & 105-3, respectively. World State Copies 104-1, 104-2 & 104-3 may be referred to collectively as the Distributed World State 104. Blockchain Copies 105-1, 105-2, & 105-3 may be referred to collectively as Distributed Blockchain 105.

Each peer in Blockchain System 101 includes blockchain metadata, which defines the configuration and other aspects of Blockchain System 101. Blockchain metadata defines, inter alia, the peers of Blockchain System 101, the endorsement policy, and blockchain code.

As mentioned before, a blockchain system may comprise multiple blockchain channels. FIG. 1 depicts only one blockchain channel, which is the blockchain channel that includes Distributed Blockchain 105 and BC peers 102. However, Blockchain System 101 may include one or more other blockchain channels that each includes a respective distributed blockchain and world state. Each blockchain channel may comprise a different set of BC peers that serve in the Execute Phase, Validate Phase, or Ordering phase.

Execute-Order-Validate Approach

Endorsers are the BC peers in a blockchain channel that participate in the Execute Phase. Not all BC peers necessarily participate in the Execute Phase. A peer that does not participate in the Execute Phase is referred to herein as a non-endorser peer.

A blockchain client sends a BC transaction proposal to each of the endorsers. Each endorser simulates the proposed BC transaction to generate a read-write set. The proposed BC transaction, which includes the read-write sets generated by the endorsers, is sent as an endorsed BC transaction to the ordering service.

In the Ordering Phase, the ordering service groups endorsed BC transactions into ordered blocks. The ordered blocks are sent to the peers for processing in the Validate phase. In this phase, the peers perform validation checks on the BC transactions in each of the blocks and commit valid transactions to the distributed world state and blocks to the distributed blockchain.

The steps performed in each phase are explained below and illustrated using the elements of Blockchain System 101 depicted in FIG. 1.

Endorsement Phase

Step 1: Blockchain Client 120 (see FIG. 1) transmits a BC transaction proposal to BC peer 102-1 and BC peer 102-2. The proposed BC transaction may entail changes to multiple world state records.

In an embodiment of the present invention, the BC transaction proposal is transmitted by remotely calling a smart contract on each of BC peer 102-1 and BC peer 102-2. The smart contract was recorded in Distributed Blockchain 105 as an approved function that can be invoked by a blockchain client on any endorser to request a BC transaction with Blockchain System 101.

Step 2: BC peer 102-1 and BC peer 102-2 simulate the execution of the proposed BC transaction on their respective copies of Distributed World State 104, which are World State Copy 104-1 and World State Copy 104-2. The simulation generates a read-write set. BC peer 102-1 and BC peer 102-2 each send an endorsement response that includes the read-write set and digital signature generated by each based on certain content of the endorsement response. The endorsement response also includes data indicating whether the endorser endorses (i.e., approves) the proposed BC transaction. An endorsement response that approves a proposed BC transaction is referred to herein as an endorsement. An endorsement is sent to Blockchain Client 120 by each of BC peer 102-1 and BC peer 102-2.

If the BC transaction request is transmitted by invoking a smart contract, the endorsement response includes an identity of the smart contract assigned by Blockchain System 101 and the input arguments to the invocation of the smart contract.

Step 3: The Blockchain Client 120 collects the endorsement responses sent by BC peer 102-1 and BC peer 102-2 and packages the endorsement responses into an endorsed BC transaction. The endorsed BC transaction is sent to Ordering Service 103. In an embodiment, Blockchain client 120 sends the endorsed BC transaction to a BC peer 102, which then forwards the endorsed BC transaction to the Ordering Service 103.

Ordering Phase

Step 4: Ordering Service 103 receives the endorsed BC transactions sent from blockchain clients, including Blockchain Client 120, and organizes the BC transactions into ordered transaction blocks.

Step 5: The ordered transaction blocks are sent to all the peers of Blockchain System 101. These are BC peer 102-1, 102-2, and 102-3.

Validate Phase

Step 6: Upon receiving a transaction block, each peer of BC peers 102 independently validates each BC transaction in a transaction block by performing various validation checks as follows. Each peer determines whether a block transaction has a sufficient number of endorsements according to an endorsement policy. The digital signatures from each endorser in the BC transaction are checked.

Step 7: Each peer of BC peers 102 modifies world state records of the valid BC transactions in their respective copies of the world state. No change to the world state is made for an invalid BC transaction. Each peer appends the respective transaction block in the respective blockchain copy of the peer. Each peer commits both the change to their copy of the world state and the appending of the transaction block to their copy of the blockchain together. A transaction block includes BC transactions that are valid or invalid.

An Execute-Order-Validate approach is described in Jeet Ann Chacko, et al., entitled *Why Do My Blockchain Transactions Fail?* (ACM SIGMOD 2021), dated 8 Mar. 2021, the entire contents of which are incorporated herein by reference. Blockchain systems are also described in U.S. patent application Ser. No. 16/261,363, filed by Carlo Innocenti on Jan. 29, 2019, the entire contents of which are incorporated herein by reference (computing nodes are referred to therein as nodes).

Prepare Phase for Staged Transaction

Figure 2:
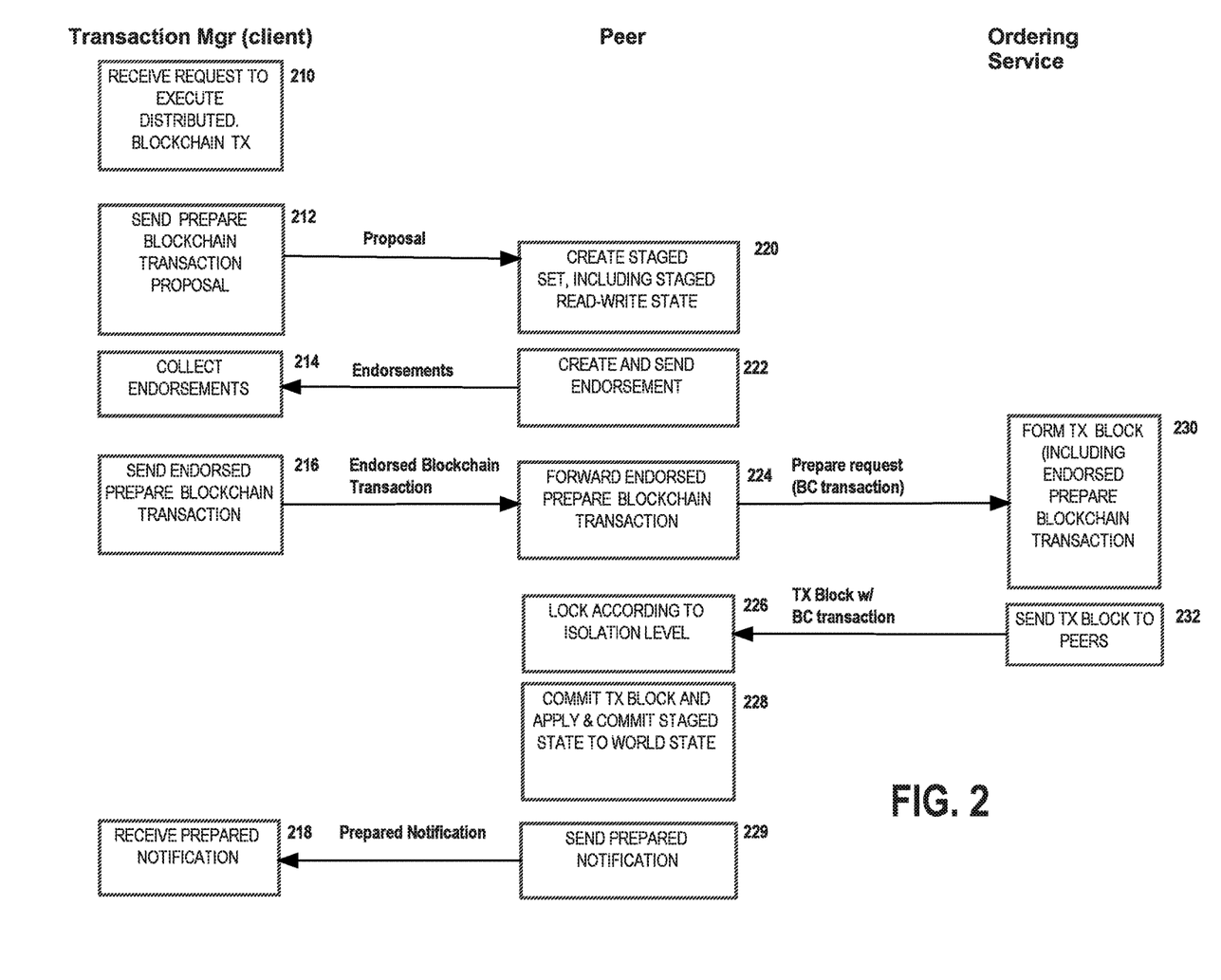
FIG. 2 is a diagram depicting operations performed for a prepared phase of a staged transaction according to an embodiment of the present invention.

FIG. 2 depicts operations executed with respect to a blockchain channel for the prepare phase of a staged transaction. In particular, FIG. 2 depicts the operations performed by a transaction manager, the peers, and the ordering service of a blockchain channel. The transaction manager operates as a blockchain client for the blockchain channel. As mentioned previously, a staged transaction comprises a prepare BC transaction followed by either a commit BC transaction or a rollback BC transaction. The operations depicted in FIG. 2 involve committing the prepare BC transaction to add staged values to the world state.

Referring to FIG. 2, the transaction manager receives a request to perform a distributed blockchain transaction. The request specifies to execute multiple BC transactions on respective blockchain channels as a distributed transaction. For example, the request may request to execute two smart contracts against separate blockchain channels together as a distributed transaction.

In addition, the request specifies an isolation level. The isolation level determines the kind of locking performed for a staged transaction in the distributed blockchain transaction, as shall be explained in greater detail.

In response to receiving the request for a distributed blockchain transaction, the transaction manager generates a distributed transaction identifier ("DTXID") and sends a prepare BC transaction proposal to each of the separate blockchain channels. The prepare BC transaction proposal includes the DTXID. For example, the transaction manager sends, to each of the peers of each of the separate blockchain channels, a prepare blockchain transaction proposal to execute one of the two smart contracts.

Operations depicted in FIG. 2. are performed by the either the transaction manager, each peer, or the ordering service of the blockchain channels. Operations that are performed by peers are further described herein with respect to one peer of one of the blockchain channels.

In response to a peer receiving a prepare blockchain transaction proposal, the peer generates a read-write state referred to as the staging write-set. (220) The staging read-write state includes a read version of the world state records to be changed.

The write set, however, rather than containing the new values for the world state records to be changed, includes the new values as the staged values of "staged records". The write set is referred to herein as the staging write set. Staged records are staged versions of the world state records to be changed. At the commit phase, as shall be explained in greater detail, the world state records to be changed are set to the staged values stored in their respective staged records.

The staging write set also includes transaction metadata records, which hold transaction metadata that describes the staged transaction. The staged records and transaction metadata records are referred to herein collectively as the staged state.

For example, the following world state record stores a balance for a user Kerry as a key-value pair. A distributed blockchain transaction DTX53 (DTX53 is a DTXID) changes the balance from 20 to 30. The read-write set for the prepare BC transaction includes the following read-write set.

| Read Set | Write Set |
| --- | --- |
| "Kerry" = 20 | "2PC.Staged.DTX53.Kerry" = 30<br>"2PC.Status.DTX53" =<br>"state=prepared,<br>isolevel = read-commit" |

The world state record having key "2PC.Staged.DTX53.Kerry" is a staged record. The world state record having key "2PC.Status.DTX53" is a transaction metadata record specifying that the status of the staged transaction of distributed transaction DTX53 is prepared and that the isolation level is read-commit.

Next, the peer creates and sends an endorsement to the transaction manager based on the staged state. (222) Then, the transaction manager collects the endorsements from peers in the blockchain channel. (214)

The transaction manager packages the endorsements into an endorsed prepared BC transaction. The transaction manager then sends the endorsed prepared BC transaction to a peer for forwarding to the order service. (216) The peer then forwards the endorsed prepared BC transaction to the ordering service. (224)

The ordering service forms a transaction block that includes the prepared BC transaction. (230). The ordering service then sends the transaction block to the peers. (232)

In response to receiving the transaction block, the peers lock changed world state records if the isolation level requires locking, as shall be explained later. (226)

Next, the peers commit the transaction block to their respective copy of the blockchain and commit the staged state in their respective copy of the world state. (228) Committing the staged state entails committing the staged records and transaction metadata record. At this stage, the stage transaction is prepared to commit.

Figure 3:
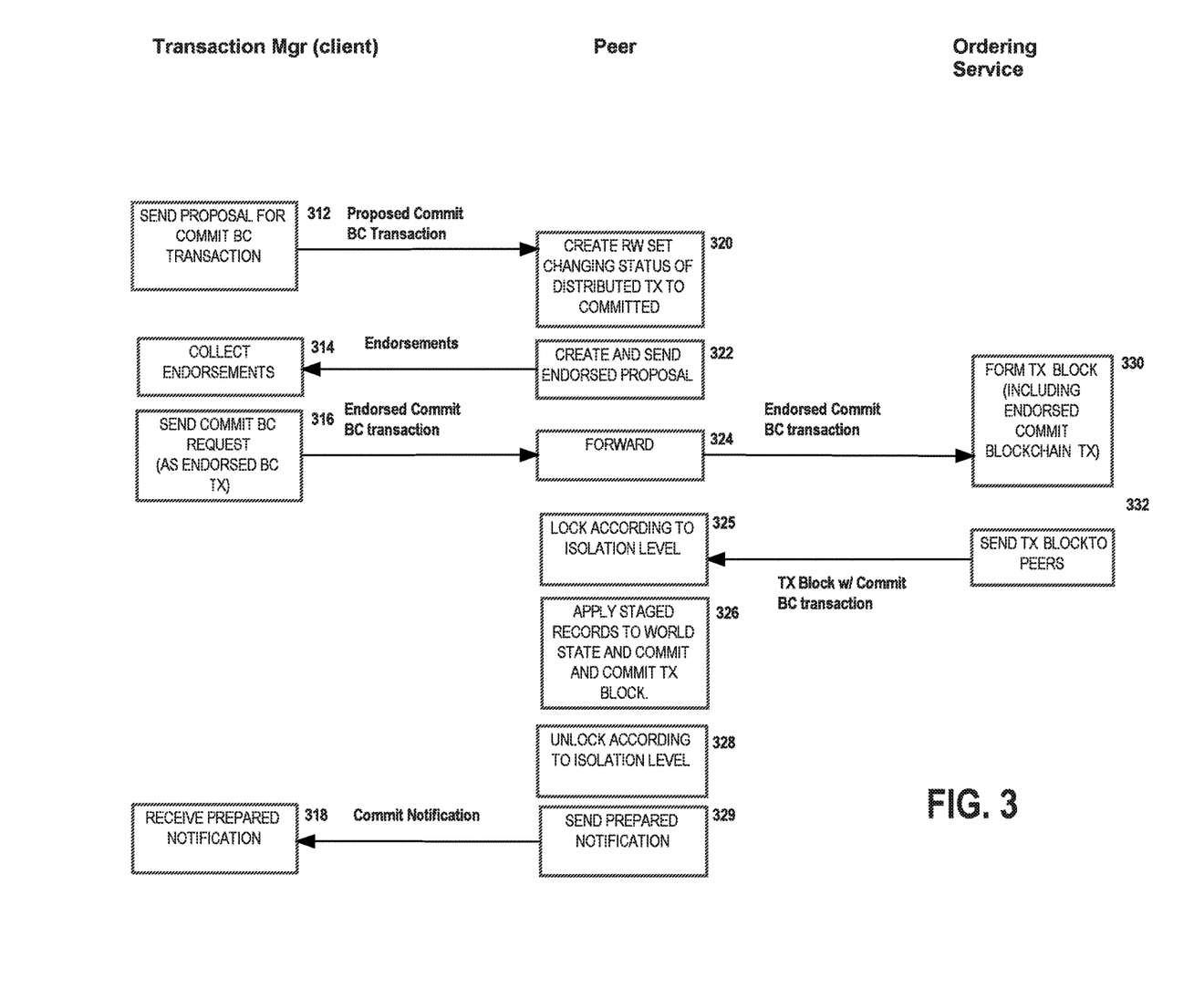
FIG. 3 is a diagram depicting operations performed for a committed phase of a staged transaction according to an embodiment of the present invention.

The peers send a prepared notification to the transaction manager. The prepared notification may simply include an acknowledgment that the endorsed prepare BC transaction is committed, that is, the transaction block holding the prepare BC transaction is committed, and that the respective write set of the prepare BC transaction is committed to the world state. (229) The transaction manager receives the prepared notification. (218) COMMIT PHASE OF STAGED TRANSACTION FIG. 3 depicts the operations performed by either a transaction manager, the peers, or the ordering service of a blockchain channel during the commit phase. The operations may be commenced by the transaction manager in response to receiving prepared notifications from the peers.

Referring to FIG. 3, the transaction manager sends a commit BC transaction proposal to each of the separate blockchain channels. (312) For example, the transaction manager sends, to each of the peers of each of the separate channels, a commit BC transaction proposal.

(320) In response to a peer receiving a commit BC transaction proposal, the peer generates a read-write state referred to herein as the commit read-write set. The commit write set specifies changes to the respective transaction metadata record that denotes that the respective distributed blockchain transaction is committed. For example, the write set for the commit BC transaction for distributed blockchain transaction DTX53 includes the following:

"2PC.Status.DTX53" = "state=committed, isolevel = read-commit"

Next, the peer creates an endorsement based on the committed BC transaction and sends the endorsement to the transaction manager. (322) Then the transaction manager collects the endorsements sent from the peers. (314)

The transaction manager packages the endorsements into an endorsed commit BC transaction. The transaction manager sends the endorsed commit BC transaction to a peer. (316) The peer forwards the endorsed commit BC transaction to the ordering service. (324)

The ordering service forms a transaction block that includes the endorsed commit BC transaction. (330). The ordering service sends the transaction block to the peers. (332)

(325, 326) In response to receiving the transaction block, the peer changes the values of the world state records to the respective staged value stored in the corresponding staging record. If the isolation level requires, the world state records are locked before changing the world state records. In the current example, the world state record (as set to the staging value), and corresponding staging record, are shown below.

| World State Record | Corresponding Staged Record |
|---|---|
| "Kerry" = 30 | "2PC.Staged.DTX53.Kerry" = 30 |

Next, the peer commits the change of the world state record to the staged value and the transaction metadata record as set to specify the state of staged transaction. The transaction block is also committed to the respective blockchain copy of the peer. At this stage, the distributed transaction is committed. The committed world state record and transaction metadata record are referred to herein as the committed state.

Next, the peer unlocks world state records that were locked for the distributed blockchain transaction, if any. (328) The peer sends a committed notification to the transaction manager. The committed notification may simply include an acknowledgment that the endorsed committed BC transaction is committed, that is, the transaction block holding the committed BC transaction is committed, and that the respective write set of the committed BC transaction is committed to the world state. (329) The transaction manager receives the prepared notification. (318)

Rolling Back Phase for Staged Transaction

Figure 4:
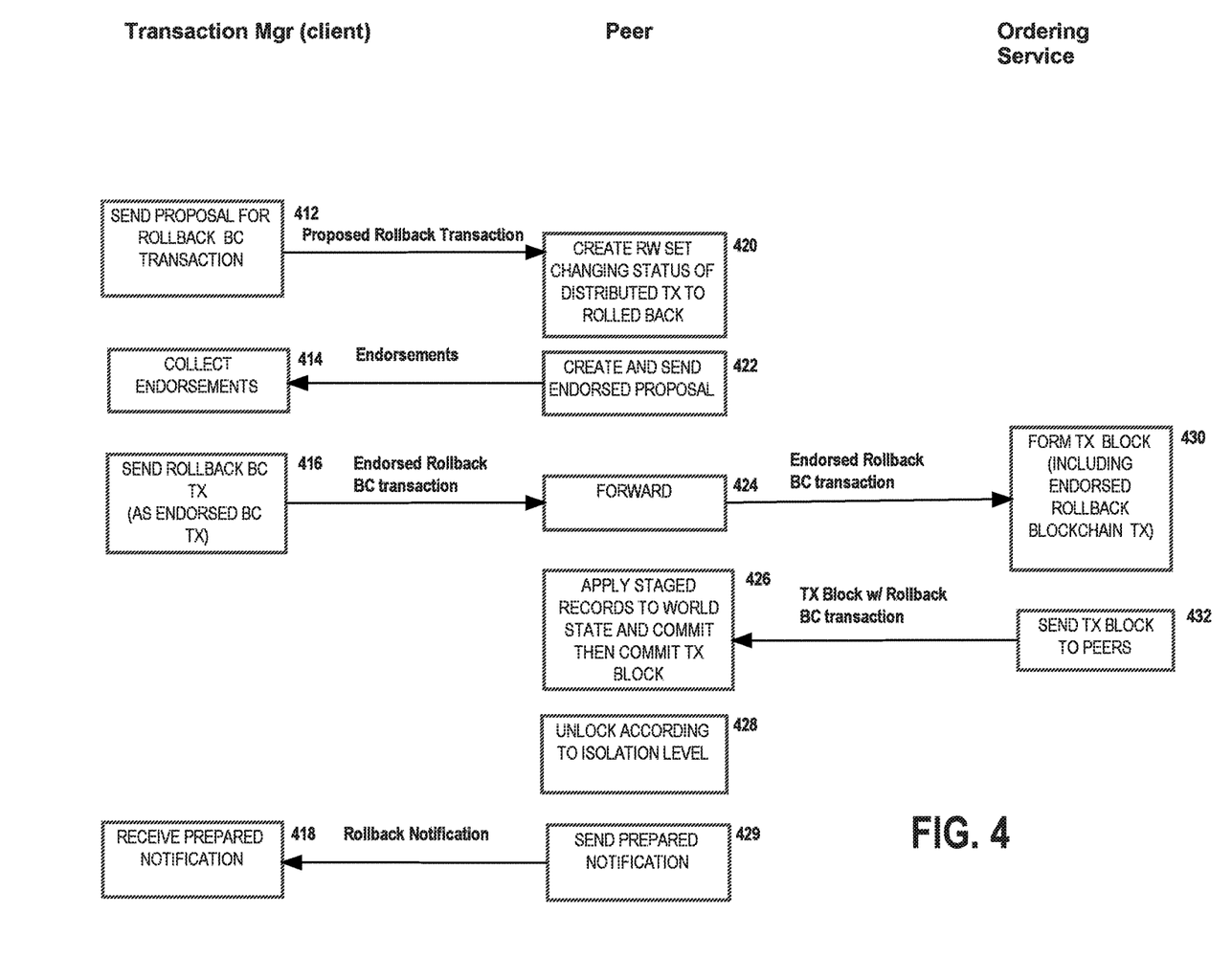
FIG. 4 is a diagram depicting operations performed for a rollback phase of a staged transaction according to an embodiment of the present invention.

FIG. 4 depicts the operations performed by either the transaction manager, the peers, or the ordering service of a blockchain channel during the rollback phase. The operation may be commenced by the transaction manager in response to receiving prepared notifications from the peers.

Referring to FIG. 4, the transaction manager sends a rollback BC transaction proposal to each of the separate blockchain channels. (412)

(420) In response to a peer receiving a rollback BC transaction proposal, the peer generates a read-write state referred to herein as the rollback read-write set. The rollback read-write set specifies changes to the respective transaction metadata record to denote that the respective distributed blockchain transaction is rolled back. For example, the write set for distributed blockchain transaction DTX53 includes the following:

"2PC.Status.DTX53"="state=rollback, isolevel=read-commit"

Next, the peer creates an endorsement based on the proposed rollback BC transaction and sends the endorsement to the transaction manager. (422) The transaction manager collects the endorsements from the peers. (414)

The transaction manager packages the endorsement into an endorsed rollback BC transaction. The transaction manager sends the endorsed rollback BC transaction to a peer. (416) The peer forwards the endorsed rollback BC transaction to the ordering service. (424)

The ordering service forms a transaction block that includes the endorsed rollback BC transaction. (430). The ordering service sends the transaction block to the peers. (432)

In response to receiving the transaction block, the peer forgoes changing the values of the world state records to the respective staged value stored in the corresponding staging records. The peer commits the changes to the transaction metadata record and transaction block. (426) At this stage, the distributed transaction is rolled back.

Next, the peer unlocks world state records that were locked for the distributed blockchain transaction, if any. (428) The peer sends a rollback notification to the transaction manager. The rollback notification may simply include an acknowledgment that the endorsed rollback BC transaction is committed, that is, the transaction block holding the rollback BC transaction is committed, and that the respective write set of the rollback BC transaction is committed to the world state. (429) The transaction manager receives the prepared notification. (418)

XA Transaction

According to an embodiment, a distributed transaction involving a staged transaction may be a heterogeneous-distributed transaction. The blockchain system and other participants may participate in the distributed transaction using a distributed transaction protocol specified in the X/Open XA specification. A distributed transaction that uses the protocol specified in the X/Open XA specification is referred to herein as an XA transaction. An XA transaction comprises branch transactions that are committed or rollbacked together using 2PC. An XA transaction is managed by a global transaction manager. Each of the branch transactions are managed by a distributed transaction participant or the global transaction manager. In an embodiment, an XA transaction includes one or more staged transactions as branch transactions.

Figure 5:
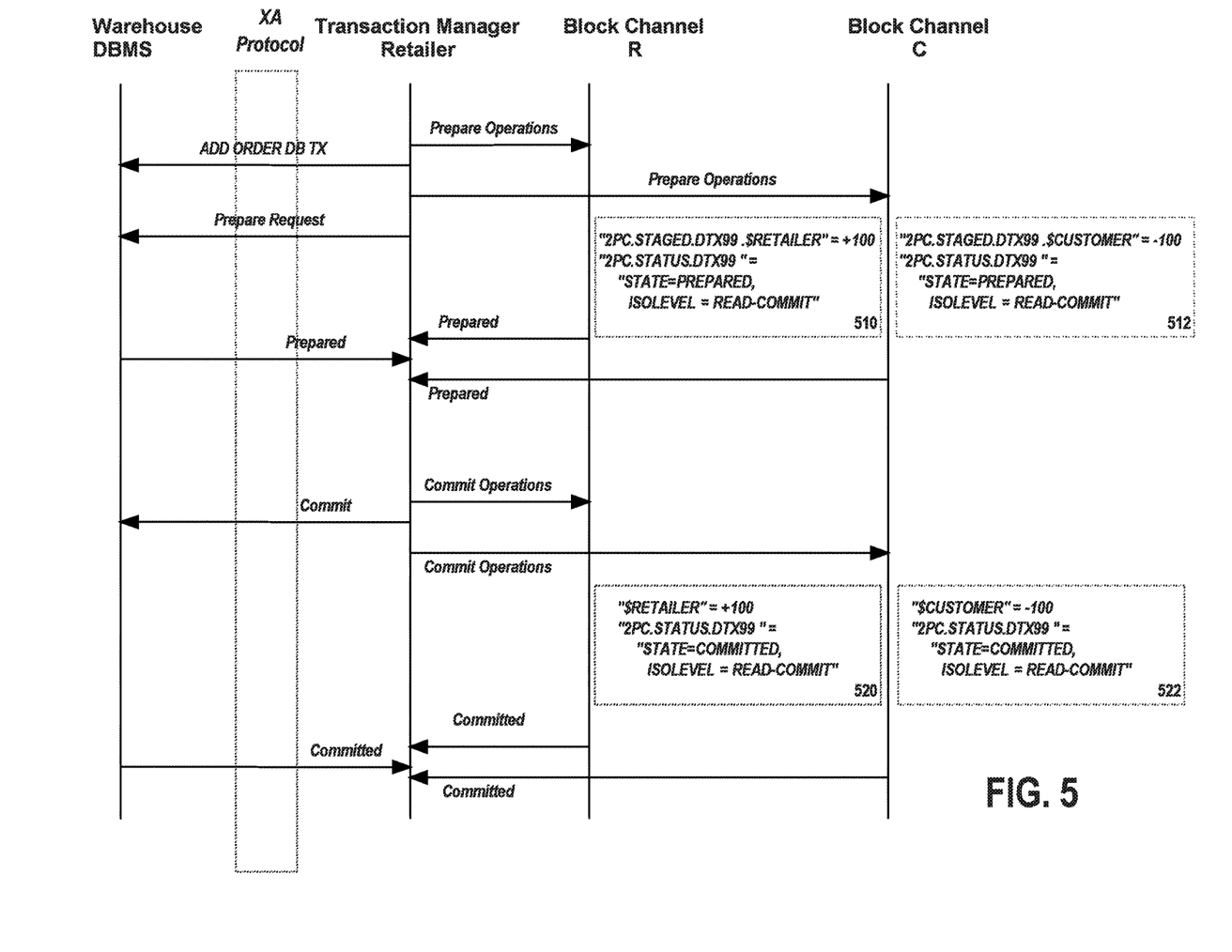
FIG. 5 is diagram depicting a heterogeneous-distributed transaction being executed according to an embodiment of the present invention.

FIG. 5 depicts an illustrative execution of a XA transaction in which a transaction manager for a staged transaction also operates as a global transaction manager of heterogeneous-distributed transactions that includes a branch database transaction executed on a participant DBMS. In the illustration depicted in FIG. 5, a blockchain transaction manager executing on behalf of a retailer is also a global transaction manager managing an XA transaction.

The XA transaction represents a purchase by a customer from a retailer for a product to be sent from a warehouse. The XA transaction includes three branch transactions, as follows.
  (1) (a) A staged transaction to record a 100 credit to the retailer on blockchain channel R and (b) a staged transaction to record a 100 debit to the customer on blockchain channel C.
  (2) A database transaction to record the order at a DBMS used by a warehouse.

The global transaction manager manages the branch transactions of the XA transaction as respective staged transactions on block channels R and C and manages the database transaction, using the XA protocol, on the warehouse DBMS.

To execute the XA transaction, the transaction manager adds prepare BC transactions to both blockchain channels R and C by performing prepare phase operations depicted in FIG. 2. Blocks 510 and 512 show the staged state committed by the prepare phase on blockchain channels R and C, respectively. Using the XA protocol, the transaction manager initiates a database transaction that adds an order to the warehouse DBMS. Within the database transaction at the warehouse DBMS, the transaction manager sends a prepare request.

After receiving prepared notifications from the warehouse DBMS and the blockchain channels, the global transaction manager coordinates the commitment of the XA transaction. The global transaction manager performs commit phase operations to commit the distributed blockchain transaction on block channels R and C. Blocks 520 and 522 show the committed states. The global transaction manager also sends a commit request to the warehouse DBMS. Finally, the transaction manager receives committed notifications from the warehouse DBMS and blockchain channels R & C.

An XA transaction and a distributed transaction, in general, can include any number of branch transactions executed as staged transactions and any number of branch transactions executed on computer systems that support 2PC for changing data at the computer system.

Isolation Levels

As mentioned before, a request to perform a distributed transaction on a blockchain system or channel may specify an isolation level. The isolation level requested determines the locking of world state records for a staged transaction executed as part of the distributed transaction. According to an embodiment, the isolation levels are serializable, read-committed, and read-uncommitted.

For the serializable isolation level, a lock is issued to lock the world state records being changed during the prepare phase before changing the staged records for the staged transaction as block 226 (See FIG. 2). A lock at this point in the staged transaction assures that records can be changed at the commit phase. For the read-committed isolation level, the world state records being changed are locked before applying the staged values of the staged records. (325) Locking at this point of a staged transaction may be desired when changes to the world state records may be tolerated between the prepare phase and commit phase.

In the read-uncommitted isolation level, the records are not locked; however, the type of change that may be made is limited. Changes to a world state record are limited to changing numeric values by applying differences or deltas to the numeric values. For example, a world state record may store a balance. Changes made by a blockchain system to the world state records apply deltas to the balance. An example of processing changes to the world state in this way is described in U.S. patent application Ser. No. 17/895,240, Minimizing Read and Update Conflict Errors In Blockchains, filed by Carlo Innocenti on Aug. 25, 2022, the entire contents of which are incorporated herein by reference.

Blockchain Peers/Participants are Computing Nodes

Each peer or participant in a blockchain system may comprise one or more computing nodes. A computing node is a combination of one or more hardware processors that each share access to a byte-addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that each communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically-marked data objects; however, the hierarchically-marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e. .java file) and the compiled version of the class (i.e. .class file).

Native data types are data types supported by a DBMS "out-of-the-box". Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as a valid data types and to be processed by a DBMS in database statements. In general, database software of a DBMS is programmed to recognize and process native data types without configuring the DBMS to do so by, for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
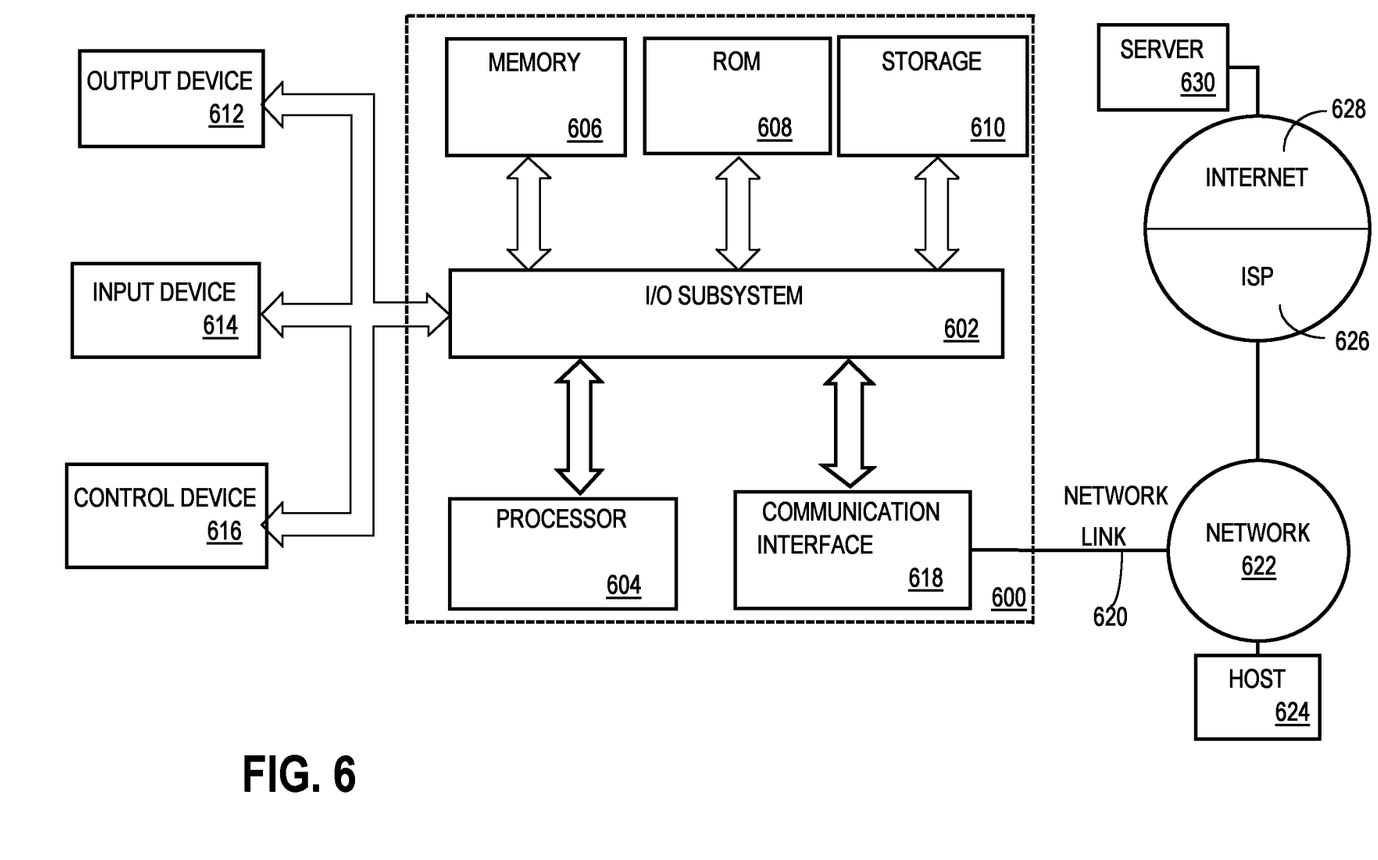
FIG. 6 is a diagram depicting a computer system that may be used to implement an embodiment of the present invention.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

Figure 7:
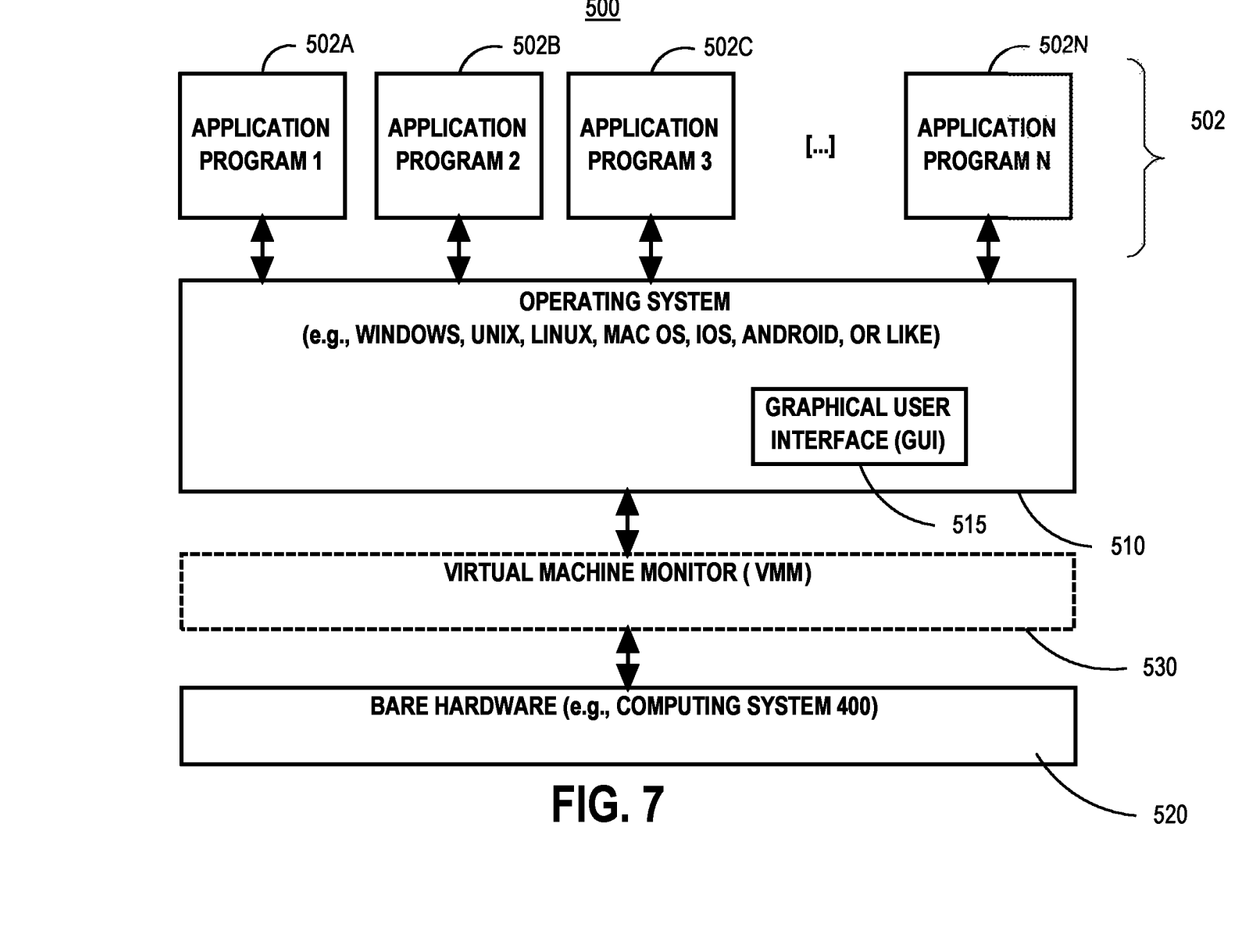
FIG. 7 depicts a software system that may be employed for controlling the operation.

FIG. 7 is a block diagram of a basic software system 700 that may be employed for controlling the operation of computer system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computer system 600. Software system 700, which may be stored in system memory (RAM) 1106 and on fixed storage (e.g., hard disk or flash memory) 1110, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 1110 into memory 1106) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 1104) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
 receiving a request to execute a particular distributed transaction that requires changing a particular world state record in a world state of a particular blockchain channel to a particular value, wherein said particular distributed transaction is a heterogeneous distributed transaction that requires changing particular data in a computer system that commits particular changes to said particular data using a two-phase protocol, wherein said heterogenous distributed transaction comprises one or more transactions executed on a blockchain system and one or more transactions executed on a non-blockchain data processing system;
 executing a particular staged transaction of said particular distributed transaction, where the particular staged transaction transitions through a prepare phase and a commit phase for changing said particular world state record to said particular value;
 within said prepare phase of said particular staged transaction of said particular distributed transaction, committing a first blockchain transaction, wherein committing said first blockchain transaction includes committing:
  a particular staged record that is set to said particular value;
  a particular transaction metadata record denoting that said particular staged transaction is prepared;
  wherein said particular staged record and said particular transaction metadata record are world state records in said world state;

receiving a prepared notification from said computer system indicating that said computer system is prepared to commit said particular change to said particular data;

after receiving said prepared notification from said computer system, sending a request to commit said particular changes;

within said commit phase of said particular staged transaction that commences after said prepare phase, committing a second blockchain transaction, wherein committing said second blockchain transaction includes committing:
- said particular world state record to said particular value; and
- said particular transaction metadata record to a value that denotes that said particular staged transaction is committed.

2. The method of claim 1, further including:

said particular distributed transaction requires changing another world state record in another blockchain channel to another value;

within a prepare phase of another staged transaction of said particular distributed transaction, committing a third blockchain transaction, wherein committing said third blockchain transaction includes committing:
- another staged record set to said another value;
- another transaction metadata record denoting that said another staged transaction is prepared;

within a commit phase of said another staged transaction, committing a fourth blockchain transaction, wherein committing said fourth blockchain transaction includes committing:
- said another world state record to said another value; and
- said another transaction metadata record to a value that denotes that said particular staged transaction is committed.

3. The method of claim 1, further including:

a blockchain client of said particular blockchain channel proposing said first blockchain transaction to at least one peer of said particular blockchain channel; and said blockchain client receiving a prepared notification from said at least one peer of said particular blockchain channel.

4. The method of claim 1, further including:

a blockchain client of said particular blockchain channel proposing said second blockchain transaction to at least one peer of said particular blockchain channel; and said blockchain client receiving a commit notification from said at least one peer of said particular blockchain channel.

5. The method of claim 1, wherein said computer system is a database management system.

6. The method of claim 1, further including:

receiving a request to execute another distributed transaction that requires changing another world state record in said particular blockchain channel to another value;

within a prepare phase of another staged transaction of said another distributed transaction, committing a third blockchain transaction, wherein committing said third blockchain transaction includes committing:
- another staged record set to said particular value;
- another transaction metadata record denoting that said another staged transaction is prepared;

within a rollback phase of said another staged transaction, committing a fourth blockchain transaction, wherein committing said second blockchain transaction includes committing said another transaction metadata record to a value that denotes that said particular staged transaction is rolled back.

7. The method of claim 1, further including locking said particular world state record during said prepare phase.

8. The method of claim 1, further including locking said particular world state record during said commit phase.

9. The method of claim 1, wherein said blockchain system comprises said particular blockchain channel, wherein said blockchain system is configured to modify a blockchain and a respective world state using an endorsement phase, an ordering phase, and a validate phase.

10. One or more computer-readable non-transitory storage media storing one or more sequences of instructions that, when executed by one or more computing devices, cause:

receiving a request to execute a particular distributed transaction that requires changing a particular world state record in a world state of a particular blockchain channel to a particular value, wherein said particular distributed transaction is a heterogeneous distributed transaction that requires changing particular data in a computer system that commits particular changes to said particular data using a two-phase protocol, wherein said heterogenous distributed transaction comprises one or more transactions executed on a blockchain system and one or more transactions executed on a non-blockchain data processing system;

executing a particular staged transaction of said particular distributed transaction, where the particular staged transaction transitions through a prepare phase and a commit phase for changing said particular world state record to said particular value;

within said prepare phase of said particular staged transaction of said particular distributed transaction, committing a first blockchain transaction, wherein committing said first blockchain transaction includes committing:
- a particular staged record that is set to said particular value;
- a particular transaction metadata record denoting that said particular staged transaction is prepared;
- wherein said particular staged record and said particular transaction metadata record are world state records in said world state;

receiving a prepared notification from said computer system indicating that said computer system is prepared to commit said particular change to said particular data;

after receiving said prepared notification from said computer system, sending a request to commit said particular changes;

within said commit phase of said particular staged transaction that commences after said prepare phase, committing a second blockchain transaction, wherein committing said second blockchain transaction includes committing:
- said particular world state record to said particular value; and
- said particular transaction metadata record to a value that denotes that said particular staged transaction is committed.

11. The one or more computer-readable non-transitory storage media of claim 10, wherein the one or more sequences of instructions include instructions that, when executed by one or more computing devices, cause:

said particular distributed transaction requires changing another world state record in another blockchain channel to another value;

within a prepare phase of another staged transaction of said particular distributed transaction, committing a third blockchain transaction, wherein committing said third blockchain transaction includes committing:
another staged record set to said another value;
another transaction metadata record denoting that said another staged transaction is prepared;

within a commit phase of said another staged transaction, committing a fourth blockchain transaction, wherein committing said fourth blockchain transaction includes committing:
said another world state record to said another value; and
said another transaction metadata record to a value that denotes that said particular staged transaction is committed.

12. The one or more computer-readable non-transitory storage media of claim 10, wherein the one or more sequences of instructions include instructions that, when executed by one or more computing devices, cause:
a blockchain client of said particular blockchain channel proposing said first blockchain transaction to at least one peer of said particular blockchain channel; and
said blockchain client receiving a prepared notification from said at least one peer of said particular blockchain channel.

13. The one or more computer-readable non-transitory storage media of claim 10, wherein the one or more sequences of instructions include instructions that, when executed by one or more computing devices, cause:
a blockchain client of said particular blockchain channel proposing said second blockchain transaction to at least one peer of said particular blockchain channel; and
said blockchain client receiving a commit notification from said at least one peer of said particular blockchain channel.

14. The one or more computer-readable non-transitory storage media of claim 10, wherein said computer system is a database management system.

15. The one or more computer-readable non-transitory storage media of claim 10, wherein the one or more sequences of instructions include instructions that, when executed by one or more computing devices, cause:
receiving a request to execute another distributed transaction that requires changing another world state record in said particular blockchain channel to another value;
within a prepare phase of another staged transaction of said another distributed transaction, committing a third blockchain transaction, wherein committing said third blockchain transaction includes committing:
another staged record set to said particular value;
another transaction metadata record denoting that said another staged transaction is prepared;
within a rollback phase of said another staged transaction, committing a fourth blockchain transaction, wherein committing said second blockchain transaction includes committing said another transaction metadata record to a value that denotes that said particular staged transaction is rolled back.

16. The one or more computer-readable non-transitory storage media of claim 10, wherein the one or more sequences of instructions include instructions that, when executed by one or more computing devices, cause locking said particular world state record during said prepare phase.

17. The one or more computer-readable non-transitory storage media of claim 10, wherein the one or more sequences of instructions include instructions that, when executed by one or more computing devices, cause locking said particular world state record during said commit phase.

18. The one or more computer-readable non-transitory storage media of claim 10, wherein said blockchain system comprises said particular blockchain channel, wherein said blockchain system is configured to modify a blockchain and a respective world state using an endorsement phase, an ordering phase, and a validate phase.

\* \* \* \* \*

UNITED STATES PATENT AND TRADEMARK OFFICE
CERTIFICATE OF CORRECTION

| | | |
|---|---|---|
| PATENT NO. | : 12,373,424 B2 | Page 1 of 1 |
| APPLICATION NO. | : 18/301115 | |
| DATED | : July 29, 2025 | |
| INVENTOR(S) | : Innocenti et al. | |

It is certified that error appears in the above-identified patent and that said Letters Patent is hereby corrected as shown below:

On the Title Page

On page 2, Column 2, item (56) under Other Publications, Line 21, delete "Immutalilization" and insert -- Immutabilization --.

On page 2, Column 2, item (56) under Other Publications, Line 43, delete "Anynymous," and insert -- Anonymous, --.

In the Drawings

On sheet 1 of 7, in FIG. 1, and on the title page, the illustrative print figure, Lines 9-10, delete "with with" and insert -- with --, therefor.

On sheet 1 of 7, in FIG. 1, and on the title page, the illustrative print figure, Lines 10-11, delete "with with" and insert -- with --, therefor.

On sheet 1 of 7, in FIG. 1, and on the title page, the illustrative print figure, Lines 15-16, delete "with with" and insert -- with --, therefor.

On sheet 2 of 7, in FIG. 2, Line 4, delete "DISTRIBUTED." and insert -- DISTRIBUTED --, therefor.

In the Specification

In Column 7, Lines 8-9, delete "COMMIT PHASE OF STAGED TRANSACTION" and insert the same on Column 7, Line 9, as a heading, therefor.

In Column 11, Line 27, delete "(MondoDB™" and insert -- (MongoDB™ --, therefor.

Signed and Sealed this
Twenty-third Day of December, 2025

John A. Squires
*Director of the United States Patent and Trademark Office*